United States Patent [19]

Mor et al.

[11] Patent Number: 4,884,231

[45] Date of Patent: Nov. 28, 1989

[54] MICROPROCESSOR SYSTEM WITH EXTENDED ARITHMETIC LOGIC UNIT

[75] Inventors: Yeshayahu Mor; Leonardo Sandman, both of Cupertino, Calif.

[73] Assignee: Performance Semiconductor Corporation, Sunnyvale, Calif.

[21] Appl. No.: 912,756

[22] Filed: Sep. 26, 1986

[51] Int. Cl.$^4$ .............................................. G06F 7/00
[52] U.S. Cl. .................................................. 364/736
[58] Field of Search ...................... 364/736, 748, 749

[56] References Cited

U.S. PATENT DOCUMENTS 4,594,655  6/1986  Hao et al. ........................... 364/736
4,612,628  9/1986  Beauchamp et al. ............... 364/748
4,617,641  10/1986  Hamada .............................. 364/748

FOREIGN PATENT DOCUMENTS

55-108050  8/1980  Japan .................................... 364/748

Primary Examiner—Gary V. Harkcom
Assistant Examiner—Long T. Nguyen
Attorney, Agent, or Firm—Skjerven, Morrill, MacPherson, Franklin & Friel

[57] ABSTRACT

A microprocessor for processing operand bits has a 16 bit primary arithmetic logic unit (ALU) and shifter and a 24 bit auxiliary ALU and shifter operating in conjunction with the primary ALU. Some of the total number of operand bits are loaded into the auxiliary ALU and processed therein in advance of the processing of bits in the primary ALU. This permits a 16 bit microprocessor to perform operations with 32 bit or 48 bit operands without any performance penalties and without requiring an increase in the microcode utilized. The invention is particularly useful and valuable in such operations as multiplication and division operations, that are of a highly repetitive nature, and for all floating point operations.

3 Claims, 4 Drawing Sheets

MICROPROCESSOR SYSTEM WITH EXTENDED ARITHMETIC LOGIC UNIT

BACKGROUND OF THE INVENTION

1. Field of the Invention

This invention relates to microprocessor systems having improved characteristics in performing arithmetic operations.

2. Description of the Prior Art

Prior art microprocessor systems in general are limited to performing arithmetic operations in a single cycle on operands which are no longer than the microprocessor width itself. Thus, for example, a 16 bit microprocessor can perform arithmetic operations in a single cycle on operands no longer than 16 bits, requiring one or more additional cycles for operands longer than 16 bits. This results in a performance disadvantage in carrying out operations such as double precision integer or single precision floating point operations which employ 32 bit operands, or extended precision floating point operations which use 48 bit operands.

SUMMARY OF THE PRESENT INVENTION

In accordance with the present invention, a microprocessor system employs an auxiliary arithmetic logic unit (ALU) and shifter in which longer than the basic 16 bit word operations can be carried out in parallel with or prior to operations performed in the primary ALU and shifter without any slowdown. Using this structure and with suitable microcode control, the present invention requires fewer cycles to perform arithmetic operations on operands longer than the primary ALU width, resulting in significantly higher throughput, and less microcode to control these operations. The invention is based on the fact that the least significant parts of the operands are immediately ready for processing in the auxiliary ALU, and processing will take place while the most significant parts of the operands are selected and fed through the buses into the primary ALU.

DESCRIPTION OF THE PREFERRED EMBODIMENT

Figures 1, 1A:
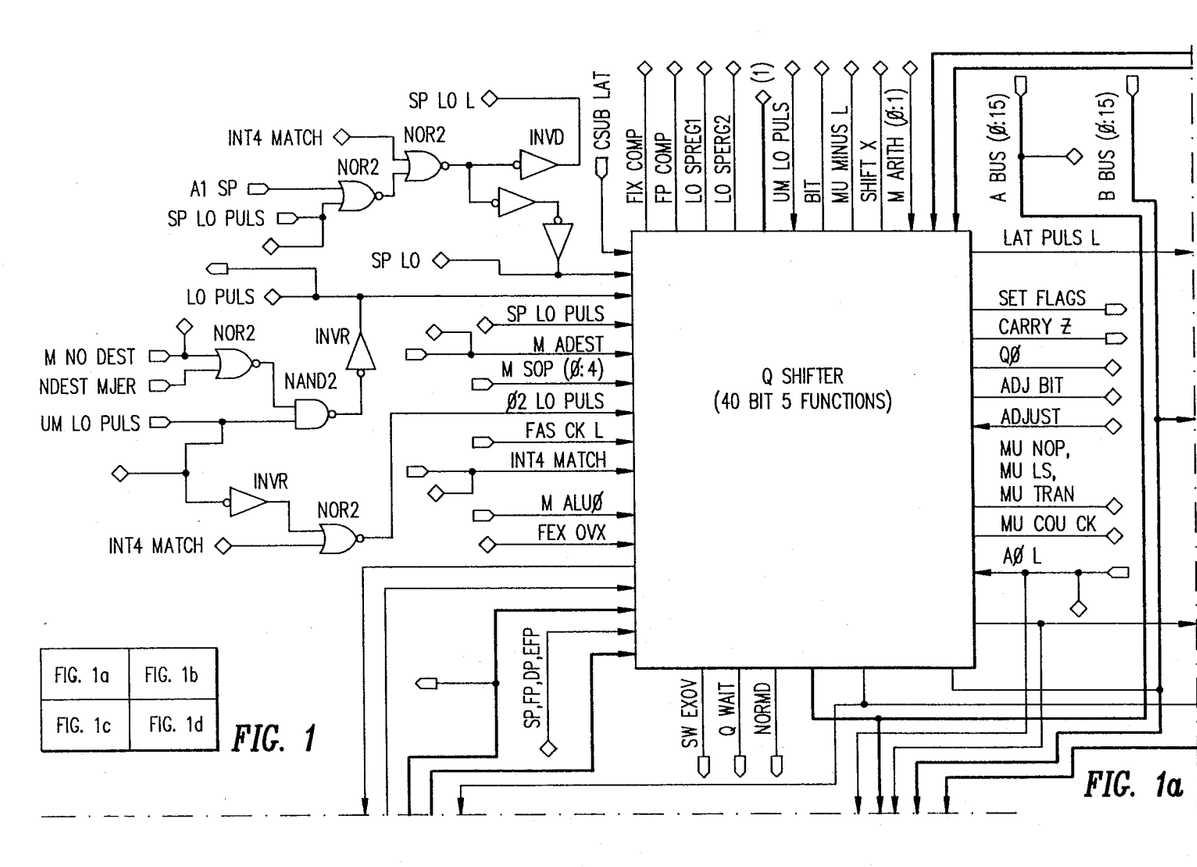
FIG. 1 shows the layout for FIGS. 1a, 1b, 1c, 1d.
FIGS. 1a, 1b, 1c, and 1d are a schematic diagram of the portion of a microprocessor system for implementing the present invention.
Figure 1B:
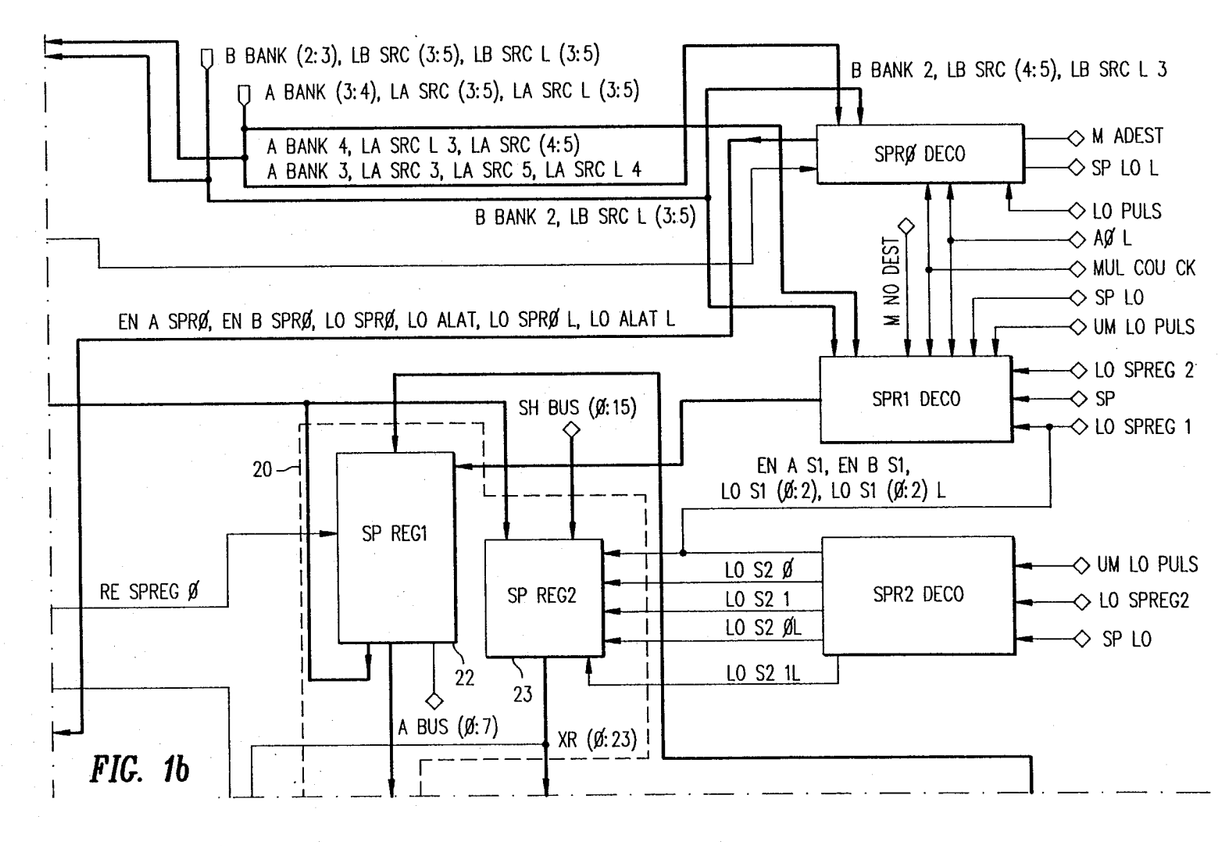
Figure 1C:
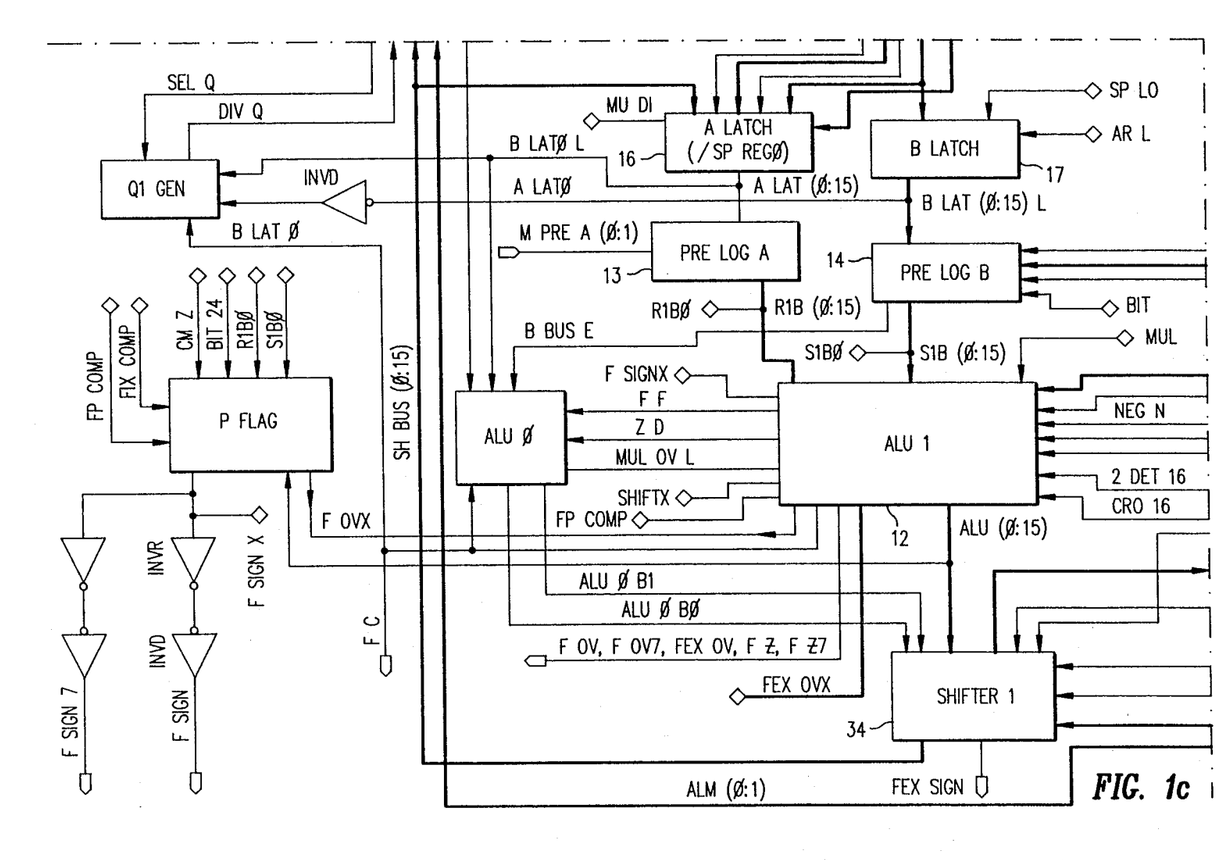
Figure 1D:
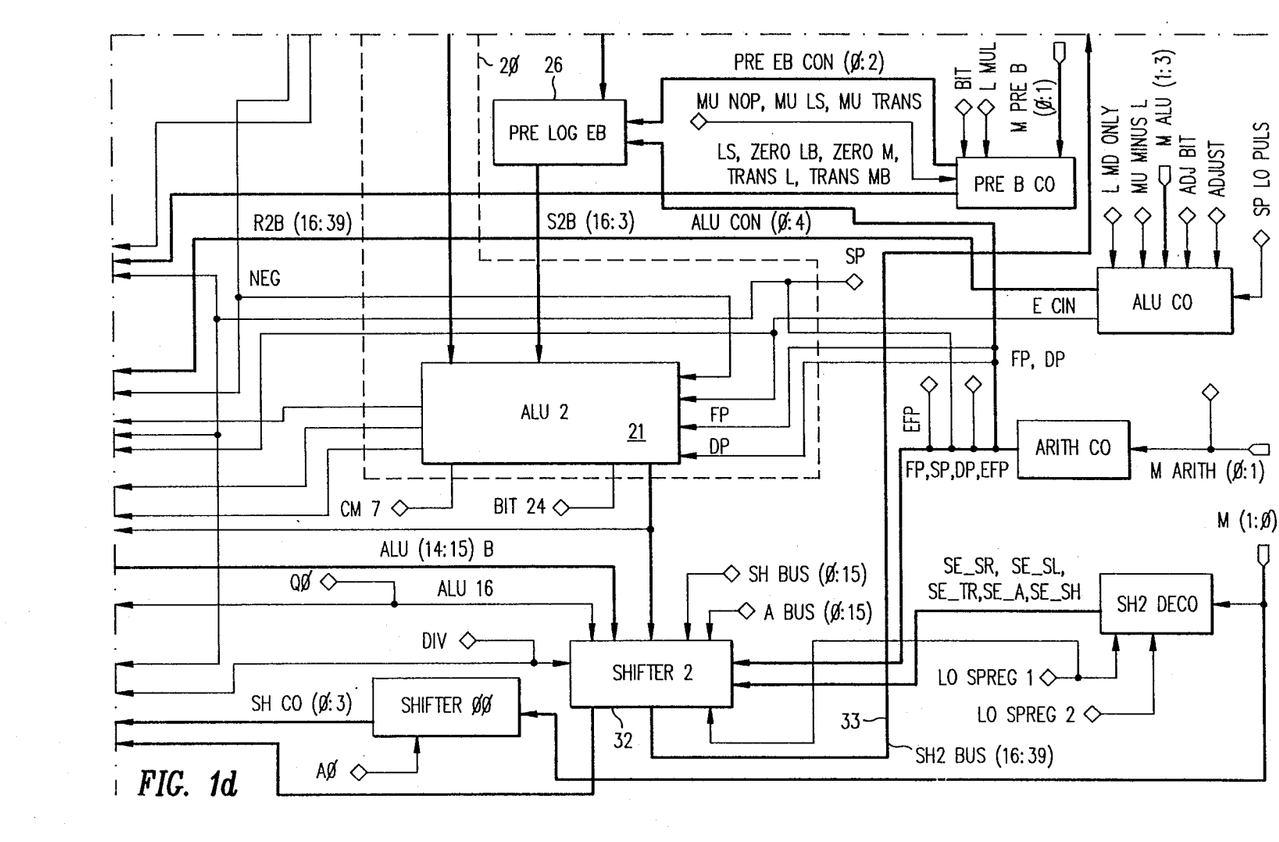

FIG. 1 shows a primary ALU 12 having one input on an A bus from an A bus prelogic unit 13 and another input on a B bus from a B bus prelogic unit 14. Prelogic unit 13 receives an input from an A latch unit (also called special register SP-REG0) 16, while prelogic unit 14 receives its input from a B latch unit 17.

The major portion of the circuitry involved in the present invention is shown in dotted enclosure 20 and includes an auxiliary ALU 21, a first special register (SP-REG1) 22 and a second special register (SP-REG2) 23. The output of special register 22 is supplied as the input to the A bus of auxiliary ALU 21, while the output of special register 23 is supplied through a prelogic unit 26 to the B bus input of ALU 21. In one particularly useful embodiment in connection with a 16 bit primary AL 12, special registers 22, 23 and auxiliary ALU 21 have widths of 24 bits each. The present invention employs two formats of floating point data; one contains 32 bits, of which 8 bits are exponent and the remainder of 24 is the mantissa. The other format is an extended floating point which again has 8 bits of exponent and 40 bits of the mantissa. The 40 bits combined ALU will process the 40 bit mantissa in the case of the extended format and the 24 bits of mantissa in the case of the regular floating point. Operation on the exponent is done in the primary ALU 12 in parallel with the loading of the least significant bits into the special registers. That is, while loading the least significant bits of the mantissa into the special registers, the system can execute the required operation on the exponent.

A shifter 32 is connected to the output of auxiliary ALU 21. Shifter 32 is implemented in a multiplexer which performs post logic operations. By adding two extra channels to the multiplexer, special register 22 can be loaded from the A bus directly or from a shifter bus 33 (SH BUS 16:39) which is the output of the ALU and is the main channel for transferring information in the machine. Shifter bus 33 (SH2-BUS (16:39)) represents the 24 bit output of shifter 32 which is the output of the ALU 21. Shifter 32 receives the ALU (14:15) bits from the primary ALU 12, and shifter 34 receives ALU 16 bit from the auxiliary ALU 21, to provide a combined 40 bit, 1 and 2 step right and 1 step left shifter.

The main advantages of the architecture of the present invention are in multiplication and division instructions, since it allows the system to perform the long repetitive steps one after the other rather than breaking each step into 2 or 3 16 bit substeps. The present system can boost performance up to three times in the case of extended floating point, where prior art systems need three cycles with a 16 bit machine. The second contribution of the present invention is in reducing the size of the microcode required, because each step will require one microinstruction instead of two or three if it is broken to 16 bit operations.

In a traditional microprocessor system the execution part can be roughly divided into two phases. In one phase decoding is done to select the operands to be operated on in the ALU, and the buses must be driven. The buses are very heavily loaded, which makes this step a time consuming part of the operation. In the second phase, the data must pass through temporary registers and enter the execution part, including the prelogic, ALU and the postlogic. In the present invention in the auxiliary part, all operations start immediately, because the operands, that always reside in special register 1 and special register 2, have been loaded in the previous microcycle, and there is no need for the operand selection and bus driving phase.

In a typical long word operation, the first microinstruction is used to load the least significant parts of the operand into special register 1 and special register 2. On the second microinstruction the most significant 16 bit operands are selected and driving the busses begins in the primary execution unit, while the auxiliary system can start propagating information in ALU 21. That is, the operation of ALU 21 is being implemented while the data is being loaded into prelogic A and prelogic B for primary ALU 12. In that way, up to 40 bit operations can be performed in one microcycle without any degradation in performance.

Moreover, the first microcycle where the special registers 22, 23 are loaded can be used for a useful operation in the primary execution unit, as shown below. For example, in floating point operations, the least significant word has 16 bits, 8 bits of it being the exponent.

The present invention allows an execution of the exponents to occur in parallel with loading the least significant part of the mantissa into special registers 1 and 2. The 16 least significant bits of the two operands that contain 8 exponent bits and 8 least significant mantissa bits are selected on the A bus and the B bus and fed both to the primary ALU where the exponent parts are operated on and to the auxiliary ALU where the mantissa parts are latched into the special registers.

To demonstrate the invention, the following examines double precision integer add, and floating point multiply instructions.

DOUBLE PRECISION INTEGER ADD OPERATION

Referring to the attached page 64 of the PAC 1750A microcode, the first instruction is labeled cycle 274 and the comments are on the right. The two 32 bit operands identified in this instruction are in registers RA and RA+1, and in registers RB and RB+1. They have to be added and the result put in registers RA and RA+1, the most significant part going to RA and the least significant part into RA+1. RA and RB contain the most significant part of the long integer and RA+1 and RB+1 contain the least significant part. In the first microinstruction in cycle 274 the contents of RA+1 is loaded directly through the A bus into special register 1 and the contents RB+1 is loaded into special register 2 through the B-BUS. This means that the least significant 16 bits of the first operand from RA+1 are going into special register 1 while the least significant 16 bits, from RB+1, are going into special register 2.

At the same time, RA+1 and RB+1 are added in the primary ALU and the result is loaded into RA+1. Further processing is not required for the least significant part of the operands, and the result is loaded back into RA+1 through ALU 12. In other words, RA+1 is loaded into special register 1 and RB+1 is loaded into special register 2, while in parallel therewith they are also being loaded through the temporary latches—A latch and B latch—added and the result is stored back into RA+1.

At the beginning of the execution of the second microinstruction the two operands containing the least significant bits are starting to be added in the auxiliary ALU 21. Meanwhile, in parallel, the two most significant parts of the operands, which are RB and RA, are selected, and driven into the A latch and the B latch. These two processes will take approximately the same time. By the time the operands are stable at the input of the primary ALU 12, the carry out from ALU 21 will be ready and stable such that the full 32 bit operations can complete with no delay penalty. Microcycle 0275 will set all the correct 32 bit flags (zero, carry, positive, negative) in the status register and the fixed point overflow bit, too.

In cycle 274 on line 2911, the field which is noted as "LO.SPR12" means load special register 1 and special register 2 by loading them directly from the A bus and the B bus. SDHI.1 and SDLO.1 means that RA+1 and RB+1 will be selected, respectively. The indications on line 2911 of "B.TRNS" and "A.TRNS" means that the prelogic A and prelogic B are transparent so that the data on the B bus is just transferred or passed through, as is the data on the A bus, without any masking.

On line 2912, the code "SP" appears, which means that the operation that will occur in the ALU is a single precision. (Carry in equals "0") Also on line 2912 is "A.PLUS.B" which means the ALU is doing an add of the contents of the A bus and the B bus.

Cycle 275 begins with the same pattern as cycle 274. On the A bus "SD HI" means that the A bus will get RA and that the B bus ("B.SD LO") will get RB. The destination is still A, as shown by "DST A", which means that the result is loaded back into RA. As before, prelogic B is transparent as is prelogic A (line 2917).

In a double precision integer add, ALU 12 will get the carry input from ALU 21, as indicated by DP, rather than forcing a 0 as in a single precision. "S.FLAGS" on line 2917 means set the 32 bit result flags in the status word and look for a fixed point overflow.

FLOATING POINT MULTIPLY OPERATION

The floating multiply operation is listed on the attached page 75 of the PAC1750A microcode. The first three microinstructions 013F±0141 perform the bulk of the multiplication, and the rest do post processing (such as normalization). The multiplier is in RB and R+1, the 4 multiplicand is in RA and RA+1.

The special register 0 and special register 1 where the partial products will be loaded are reset, RA+1 is loaded into special register 2 and in parallel RA is passed through the ALU to detect whether it is zero, because if it is zero the result is obviously zero. In the second instruction, cycle 0140, RB and RB+1 which contain the multiplier, are loaded into the Q shifter which is basically a shift register which can shift its contents in parallel to the ALU.

After the second step, the multiplier has been loaded into the Q register and the least significant part of the multiplicand is loaded into the special register 2. The microinstruction (0141) is the repetitive multiply step, where full 24 bit numbers, as specified by the FP mnemonic, are added or subtracted according to the multiplier least significant bits in the Q register. SDHI points to RA which contains the most significant part of the multiplicand, and the least significant part is in SPREG 2 (loaded in cycle 013F). These are added or subtracted from the partial product in SPREG 0 and SPEREG 1 that were reset to 0 in cycle 013F. At the end of cycle 0141 (which repeats 12 times) the 24 bit product resides in SPREG 0, and SPREG 1.

In microinstruction 0142 the product is moved to Q1, Qo registers for possible normalization. In microinstruction 0143 the exponents are added, exponent overflow is checked for, and normalization starts. Microinstruction 0144 is adding to the exponent the number of normalization steps as counted by the shift counter (SH-COU), and exponent overflow is checked for. In microinstruction 0145 results are returned to the registers and flags are loaded into the status register.

The main innovation is that the system can perform a 24-bit operation with a single cycle, not requiring two cycles because even though it is a 16-bit machine, parts of the operands are pre-loaded into the extended ALU portion and there is no need for them to be selected and driven on any buses when they are operated on.

```
2893    ;
2894    ;-------
2895    ;
2896    ;; POPM1:  M.W A.MAR,B.REG15,DST.B              ; R15 <-- MAR
2897    ;;/        A.TRNS,B.ZERO,A.OR.B
2898    ;;;
2899    ;;         M.W A.XX0HI,B.0.LO,NO.DEST           ; HI - LO
2900    ;;/        A.00FF,B.00FF,A.MIN.B                ; FZ FILL.PP1
2901    ;;/        FZ , FILL.PP1
2902    ;;;
2903    ;;         M.W A.ZERO,B.ZERO,A.OR.B,NO.DEST     ; GOTO POPML
2904    ;;/        GOTO , POPML
2905
2906    ;_______________________________________________________________
2907    ;
2908    ;        DOUBLE PRECISION INTEGER ADD
2909    ;                                               ; SPREG1<--RA+1
2910    ADD.DP:: M.W A.SDHI.1,B.SDLO.1, ,DST.A,DEST,    ; SPREG2<--RB+1
2911    /             ,LO.SPR12,B.TRNS,A.TRNS,          ; RA+1<--RA+1
2912    /             SP,A.PLUS.B, , , ,                ;   PLUS RB+1
2913 0274 /           EN.IRLAT,CONT,F.IC               ;
         00101 00010 0000000000 1 0 00 10101 00 00 00 0111 11111
         111 0 1 11111 010
2914    ;                                               ; F.IC,EN LAT
2915    ;
2916             M.W A.SDHI,B.SDLO, ,DST.A,DEST,        ; RA<--RA+RB
2917    /             ,S.FLAGS,B.TRNS,A.TRNS,            ; SET FLAGS
2918    /             DP,A.PLUS.B,FXP.OVF,INCR.IC,-     ; IC++,WAIT
         WAIT,
2919 0275 /           ,EXIT, ,                          ; SET PI4 IF FXOV
         00110 00011 0000000000 1 0 00 11101 00 00 10 0111 10111
         000 1 0 01111 111
2920    ;                                               ; EXIT
2921    ;
2922    ;_______________________________________________________________
2923    ;
2924    ;        DOUBLE PRECISION INTEGER SUBTRACT
2925    ;                                               ; SPREG1<--RA+1
2926    SUB.DP:: M.W A.SDHI.1,B.SDLO.1, ,DST.A,DEST,    ; SPREG2<--RB +1
2927    /             ,LO.SPR12,B.TRNS,A.TRNS,          ; RA+1<--RA+1
2928    /             SP,A.MIN.B, , , ,                 ; MINUS RB+1
2929 0276 /           EN.IRLAT,CONT,F.IC               ;
         00101 00010 0000000000 1 0 00 10101 00 00 00 1101 11111
         111 0 1 11111 010
2930    ;                                               ; F.IC,EN LAT
2931    ;
2932             M.W A.SDHI,B.SDLO, ,DST.A,DEST,        ; RA<--RA --RB
2933    /             ,S.FLAGS,B.TRNS,A.TRNS,            ; SET FLAGS
2934    /             DP,A.MIN.B,FXP.OVF,INCR.IC,-      ; IC++,WAIT
         WAIT,
2935 0277 /           ,EXIT, ,                          ; SET PI4 IF FXOV
         00110 00011 0000000000 1 0 00 11101 00 00 10 1101 10111
         000 1 0 01111 111
2936    ;                                               ; EXIT
2937    ;
2938    ;_______________________________________________________________
2939    ;
2940    ;        SINGLE PRECISION LOGICAL XOR
2941    ;
2942    XOR::    M.W A.SDHI,B.SDLO, ,DST.A,DEST         ; RA<--RA XOR RB
2943    /             ,S.FLG.C0,B.TRNS,A.TRNS.           ; SET FLG_C0
2944    /             SP,A.XOR.B, ,INCR.IC,WAIT,        ; F.IC++
2945 0278 /           EN.IRLAT,EXIT,F.IC                ; EXIT
         00110 00011 0000000000 1 0 00 11100 00 00 00 0011 11111
         000 1 1 01111 010
```

```
        ;
        ;        FLOATING POINT MULTIPLY
        ;                                               ; SPREG2<-- RA+1
        FMUL::  M.W A.SDHI,B.SDHI.1,FA171 ,NO.DEST.     ; SPREG0,1<--0
        /             ,L.2.RE.01,B.ZERO,A.TRNS,         ; IF RA=0 THEN
        /             SP,A.OR.B, , ,  NO. WAIT,         ; FA171
  013F  /             EN.IRLAT.FZ,F.IC                  ; F.IC,EN LAT
```

```
            00110 00101 0100110000 0 1 00 10111 10 00 00 0001 11111
            111 0 1 00011 010
            :
                    M.W A.SDLO.B.SDLO.1,FA171              ; Q0 <— RB
        ,NO.DEST,
        /                  ,L.Q0.Q1,B.ZERO,A.TRNS,         ;Q1 <— RB+1
        /                   SP,A.OR.B, , , , ; IF RB=0 THEN
O140    /                       ,FZ, ,                     ; FA171
            00011 00010 0100110000 0 1 00 11001 10 00 00 0001 11111
            111 0 0 00011 111
            :
                    M.W A.SP.RG0,B.SDHI, , ,NO.DEST,        : MUL(FP)
        /                  SH.RS,MUL.CY,B.TRNS,A.TRNS,     :
        /                   FP,A.PLUS.B, , , ,              :
O141    /                       ,CONT. ,                    :
            10101 00110 0000000000 0 1 10 01000 00 00 01 0111 11111
            111 0 0 11111 111
            :
                    M.W A.SP.RG0.B.SP.RG1,FMUL2,            : Q0 <— SPREG0
        ,NO.DEST.
        /                  , ,A.ZERO,B.ZERO.                : Q1 <— SPREG1
        /                   SP,A.PLUS.B, L.Q0.Q1,           : IF NONORM THEN
O142    /                       ,NRM.COM, ,                 : FMUL2
            10101 01000 0101000110 0 1 00 11001 10 11 00 0111 11111
            111 0 0 00111 111
            :
                    M.W                                     : NORM
        A.SDHI.1,B.SDLO.1.FMUL3,DST.A,DEST.
        /                  ,NORM.A.TRNS,B.TRNS,              : RA+1 <— RA+1
        /                   FP,A.PLUS.B.                     :     PLUS RB+1
O143    /                       ,FEXOV, .                    : IF EX__OV THEN
            00101 00010 0101001000 1 0 00 00100 00 00 01 0111 11111
            111 0 0 00000 111
            :                                                :    FMUL3
            :
        FMUL:   M.W                                          :RA+1<—RA+1.00FF +
        A.SDHI.1.B.SH.COU.FA7,DST.A,DEST,
        /                  , ,B.TRNS.A.00FF.                 : Q1/SH__COU +1
        /                   SP,A.PLS1.B, S.FLG.FC            : BLOCK EXPONENT
O144    /                       ,FEXOV, ,                    : IF EX__OV THEN
            00101 01101 0100110001 1 0 00 11111 00 10 00 0101 11111
            111 0 0 00000 111
            :                                                :    FA7
            :
        FMUL11: M.W A.SDHI,B.Q0, ,DST.A,DEST,                : RA <— Q0
        /                  ,S.FLG.C0,A.ZERO,B.TRNS.           : SET FLG__C=0
        /                   SP,A.PLUS.B, ,INCR.IC,WAIT,       : IC++,WAIT
O145    /                       ,EXIT, ,                     : EXIT
```

| ADDR | PAC1750A MICROCODE | |
|---|---|---|
| | 00110 10000 0000000000 1 0 00 11100 00 11 00 0111 11111 000 1 0 01111 111 | |
| | : | |
| | :------------------ | |
| | FMUL2:   M.W A.SDHI.1.B.SDLO.1. DST.A | : —1X—1 CASE |
| | /                  ,B.TRNS,A.TRNS, | : RA+1<—(RA+1) |
| | /                   SP,A.PLS1.B, , , , | : +(RB+1)+1 |
| O146 | /                       ,FEXOV, FA157 | : IF EX__OV THEN |
| | 00101 00010 0100111010 1 0 00 10010 00 00 00 0101 11111 111 0 0 00000 111 | |
| | : | : FA157 |
| | : | |
| | M.W | : RA+1<—(Q1.FF00) |
| | A.Q1,B.SDHI.1,FMUL11,DST.B,DEST, | |
| | /                  , ,B.00FF,A.FF00, | : OR (RA+1.00FF) |
| | /                   SP,A.OR.B, , , , | : |
| O147 | /                       ,GOTO, , | : GOTO FMUL1 |
| | 10100 00101 0101000101 0 0 00 10010 11 01 00 0001 11111 111 0 0 10001 111 | |
| | :-------- | |
| | : | |
| | FMUL3:   M.W A.SDHI.1, NO.DEST | : PASS RA+1 |
| | /                  , ,B.ZERO,A.TRNS, | : |
| | /                   SP,A.PLUS.B, , , , | : IF EXSIGN |
| O148 | /                       ,FEXSGN, FA157 | : THEN FA157 |
| | 00101 00011 0100111010 0 1 00 10010 10 00 00 0111 11111 111 0 0 00001 111 | |
| | : | |
| | M.W   , FA7, ,NO.DEST, | : RESULT=0 |

| ADDR | PAC1750A MICROCODE | | |
|---|---|---|---|
| | / | , ,B.ZERO,A.ZERO, | : GOTO FA7 |
| | / | SP,A.OR.B, , , , | : |
| O149 | / | ,GOTO. , | : |
| | 00011 00011 0100110001 0 1 00 10010 10 11 00 0001 11111 | | |

We claim:

1. In a microprocessor for processing operands, said microprocessor having a primary arithmetic logic unit (ALU) having a plurality of inputs and an output with a first shifter connected thereto, said primary ALU having a capability of handling operands of a predetermined number of bits, said predetermined number of bits being less than the total number of bits in said operands in some operations, the improvement comprising:

an auxiliary ALU operating in conjunction with said primary ALU and said first shifter, said auxiliary ALU having a plurality of inputs and an output having a second shifter connected thereto;

a plurality of special registers connected to said inputs of said auxiliary ALU;

means for supplying some of said total number of operand bits to said special registers;

means for loading said some of said total number of operand bits from said special registers into said auxiliary ALU;

means for processing said loaded bits in said auxiliary ALU;

means for selecting bits from said operands for said primary ALU during said processing of said bits in said auxiliary ALU;

first and second latch means for receiving said selected operand bits for said primary ALU;

prelogic means connected to receive the outputs of said first and second latch means, means for connecting said first and second latch means to said inputs of said primary ALU through said prelogic means;

means for supplying and processing said selected bits in said primary ALU after said processing of said loaded operand bits in said auxiliary ALU; and means for exchanging selected bits between said first shifter and said second shifter to shift the outputs of said primary ALU and said auxiliary ALU in either direction.

2. A system in accordance with claim 1 including means for supplying the least significant bits in said operands to said special registers.

3. A system in accordance with claim 1 including means for supplying the most significant bits of said operands to said first and said second latch means.

* * * * *

UNITED STATES PATENT AND TRADEMARK OFFICE
CERTIFICATE OF CORRECTION

PATENT NO. : 4,884,231

DATED : November 28, 1989

INVENTOR(S) : Yeshayahu Mor and Leonardo Sandman

It is certified that error appears in the above-identified patent and that said Letters Patent is hereby corrected as shown below:

Col. 4, line 38, "R+1" should be --RB+1--.

Signed and Sealed this

Fifth Day of February, 1991

Attest:

HARRY F. MANBECK, JR.

Attesting Officer

Commissioner of Patents and Trademarks